United States Patent
Stockton

[11] Patent Number: 6,126,497
[45] Date of Patent: Oct. 3, 2000

[54] ELECTRO-MECHANICAL FOOT CONTROL FOR TROLLING MOTORS

[76] Inventor: Kenneth A. Stockton, 2930 Ellesmere Dr., Midlothian, Va. 23113

[21] Appl. No.: 09/356,031

[22] Filed: Jul. 16, 1999

Related U.S. Application Data

[63] Continuation-in-part of application No. 09/120,926, Jul. 22, 1998.

[51] Int. Cl.[7] .............................. B60L 15/20; B63H 25/00
[52] U.S. Cl. .................... 440/7; 114/144 RE; 114/144 A
[58] Field of Search ................................ 114/144 R, 146, 114/144 RE, 144 A, 144 E, 159; 440/2, 6, 7, 53, 58, 63

[56] References Cited

U.S. PATENT DOCUMENTS

| | | | |
|---|---|---|---|
| 2,986,953 | 6/1961 | Armond et al. | 74/478 |
| 4,527,983 | 7/1985 | Booth | 440/7 |
| 4,728,307 | 3/1988 | Burgess | 440/7 |
| 4,854,902 | 8/1989 | Havins | 440/7 |
| 4,964,820 | 10/1990 | Rayborn | 440/7 |
| 5,582,526 | 12/1996 | Cook, III | 440/2 |

*Primary Examiner*—S. Joseph Morano
*Assistant Examiner*—Patrick Craig Muldoon
*Attorney, Agent, or Firm*—Evenson, McKeown, Edwards & Lenahan, P.L.L.C.

[57] ABSTRACT

A foot operated control for controlling both the steering and speed of a trolling motor that is mounted on a boat. The foot control includes an on-off switch disposed on a conically shaped, rotatable foot plate which can support an operator's entire body weight when operating and can be accessed by the foot of an operator from plural sides without repositioning the foot control on a boat deck. The rotatable foot plate overlays a thrust bearing that is secured to a flat bodied base plate. When the foot plate is rotated by the operator's foot, motion is transferred through a mechanism, e.g. a rack and pinion, that is recessed in base plate. The rack is connected to the trolling motor by a flexible control cable, and when foot plate is rotated, the trolling motor rotates up to a desired one to one angular ratio with foot plate. A speed control knob which has a relatively large diameter and is located higher than the foot plate gives greater visibility as to speed control setting and ease of turning by the foot of an operator.

25 Claims, 6 Drawing Sheets

ELECTRO-MECHANICAL FOOT CONTROL FOR TROLLING MOTORS

CROSS REFERENCE TO RELATED APPLICATION

This application is a continuation-in-part of co-pending application Ser. No. 09/120,926, filed Jul. 22, 1998.

BACKGROUND OF THE INVENTION

This invention relates to electric trolling motors for fishing boats, and particularly to an improved foot control for steering and regulating the speed of a trolling motor.

Originally electric foot operated trolling motors have been made with a foot control high off the boat deck and similar to a see saw effect, toe and heel movement on the pedal requiring the leg to be bent and foot off the floor for long periods of time causing discomfort and the operator to be off balance. Most pivotal foot pedals required a short degree of turning radius to turn the trolling motor a fall 360 degrees, making it difficult to determine the direction of the boat, causing a fisherman to guess at how much correction to make for the boat. Further, the on-off switches were located to the side or directly under the foot, causing a constant twisting of the foot on the pedal, which in turn adversely affected the steering. Some foot controls can only be approached by the foot of operator from the back, and in order for a fisherman to fish a different direction in the boat, the foot control had to be moved and/or repositioned in that direction. The speed selectors in prior art were small or had poor access making them difficult to select or see the speed selection desired.

Therefore, a more comfortable solution has been sought after in prior alt but the combination of the right components has been difficult.

U.S. Pat. No. 5,078,070 to Clement (Jan. 7, 1992) discloses a rotary type foot control in which the actual control is done electrically rather than through a gear or cable arrangement. This system has a foot turning ratio of short degree to that of the trolling motor.

U.S. Pat. No. 4,964,820 to Rayborn (Oct. 23, 1990) discloses a trolling motor foot control for rotary movement which is flush with floor and is mounted into deck of a boat. This arrangement requires a fisherman to concentrate on a horizontal as well as a vertical movement of the foot pedal, and it presents the danger that an operator could unintentionally step into the recessed cavity and lose his or her balance. In order to achieve a low profile, this system also requires cutting into the boat deck, which is not desired by most boat owners. Furthermore, this system can only be operated from the rear of the foot pedal.

U.S. Pat. No. 4,728,307 to Burgess (Mar. 1, 1988) discloses a low profile foot control for trolling motors in which a rotary disk is used to steer the motor with a desired turning ratio of one to one to that of the trolling motor. In this system, the trolling motor shaft projects through the boat hull therefore not allowing it to be mounted on most existing boats.

U.S. Pat. No. 4,295,385 to Huttenhow (Oct. 20, 1981) discloses a control for moving a trolling motor, the control having a low profile and including a rotatable plate adapted to move a cable system connected to a trolling motor. In this system, the operator's foot does not contact floor, causing operator to be off balance. The operator's foot also has no operational contact with an on-off switch or speed control to allow a fisherman to fish with both hands on his or her fishing pole.

U.S. Pat. No. 4,527,983 to J. N. Booth (Jul. 9, 1985) discloses a foot control system for an electric trolling motor which includes a housing box 30 having a rotary disk 37 attached to a shaft that moves up and down to activate the on-off switch 45 for turning the motor on and off. In this system, to achieve a low profile, it must be built into the deck of the boat shown in FIG. 8 of its drawings. Furthermore, in this system, it is difficult for operator to maneuver his or her foot around the comers of a box housing to access rotary disk. The speed control in this system is difficult to operate in that it is mounted below and to one side of foot plate and is difficult to access from plural sides. A further problem of this prior art system is that the rotary disk or foot plate has a short degree of turning ratio to achieve a 360 degree turn of trolling motor. This requires the foot to have excess downward pressure so that the foot won't slip on the foot plate when the trolling motor is trying to be rotated. A further problem of this prior art system is that the forward portion of the foot must be lifted each time the on-off switch is disengaged, causing fisherman to either hold his foot up or to remove it from the rotary disk. In addition, this system is expensive and complex and is difficult to operate.

U.S. Pat. No. 4,854,902 to Havins (Aug. 8, 1989) discloses an electrically operated steering system for a boat comprising a foot control with a pivotable cam disk and a plurality of cam operated switches which activate the electrical circuitry of the control system. A motor speed control may also be located in the controller. This device is disadvantageous in that it does not provide a positive correlation between the position of the foot control and the steering direction of the trolling motor.

U.S. Pat. No. 5,582,526 to Cook, III (Dec. 10, 1996) discloses a trolling motor with an electrically operated steering positioning motor and a direction indicator mounted on top of the motor. No details of how the steering position motor is controlled are given. The location of the direction indicator on top of the motor is inconvenient in that it requires a fisherman to divert his attention from his fishing activities and turn around and look at the motor to determine the direction the trolling motor is pointed.

Thus it can be seen that despite the extensive efforts of the prior art, there has remained a need for more convenient foot controls for trolling motors which can be fitted to any type of boat or motor without major modification of the boat and which can be used by an operator from any direction while maintaining a comfortable position.

SUMMARY OF THE INVENTION

With fisherman spending more time on the water, a more comfortable and easier to operate system has become more desirable. Accordingly, several objectives and advantages of the present invention are:

(a) to provide a foot control of low profile, allowing an operator's foot to rest at less of an incline with his or her heel on the deck which enables both legs to remain straight in standing position for better balance and comfort, for long periods of time;

(b) to provide a foot control that can remain in one location on the boat deck and be approached and operated from a plurality of desired operational positions, all giving the same feel of operation for either foot;

(c) to provide a control which has a conically shaped foot plate mounted on a rotary thrust bearing capable of withstanding in excess of an operator's total body weight when being operated;

(d) to provide a centrally located predisposed on-off switch on the foot plate which can be actuated with only up and down movement of an operator's toe, rather than requiring movement of the entire foot, and which also allows the operator to access the foot plate from plural sides;

(e) to provide a foot control with a desired turning ratio of one to one relative to that of the trolling motor, enabling the operator's foot on the control to turn the same degree as the trolling motor, which allows operator to have a better awareness as to the boat direction and ease of turning;

(f) to provide a substantially large speed control knob displaced higher than foot plate for ease of access and having a speed indicator affixed thereon enabling ease of turning and increased visibility as to speed setting;

(g) to provide a rotatable foot plate with a directional indicator so as to make aware the direction that the trolling motor is being propelled;

(h) to provide foot control which can be made relatively economically, which does not require permanent mounting on the deck of a boat, thereby enabling it to be removed and stored easily. Further objects and advantages are to provide a foot control which can be installed easily on existing older as well as new trolling motors, which can be easily mounted and maintained by its quick disassembly. Still further objects and advantages of the present invention will become apparent from a consideration of the ensuing description and drawings.

BRIEF DESCRIPTION OF THE DRAWINGS

The invention will be described in further detail hereinafter with reference to illustrative preferred embodiments shown in the in the accompanying drawings. Like reference numerals have been employed throughout the drawings to indicate like parts in the various views. In the drawings.

DETAILED DESCRIPTION OF PREFERRED EMBODIMENTS

In accordance with the present invention, a foot operated mechanism is provided for controlling both the speed and steering direction of a trolling motor through rotational means of a foot operated disk mounted upon a bearing overlaying a base plate that contains a rack and pinion recessed into the base plate so as to achieve a low profile to give comfort of foot while operating the control. In addition, the speed control is relatively large and is mounted higher than the steering foot plate so that it is more easily visible and also can be turned more easily.

Figure 1:
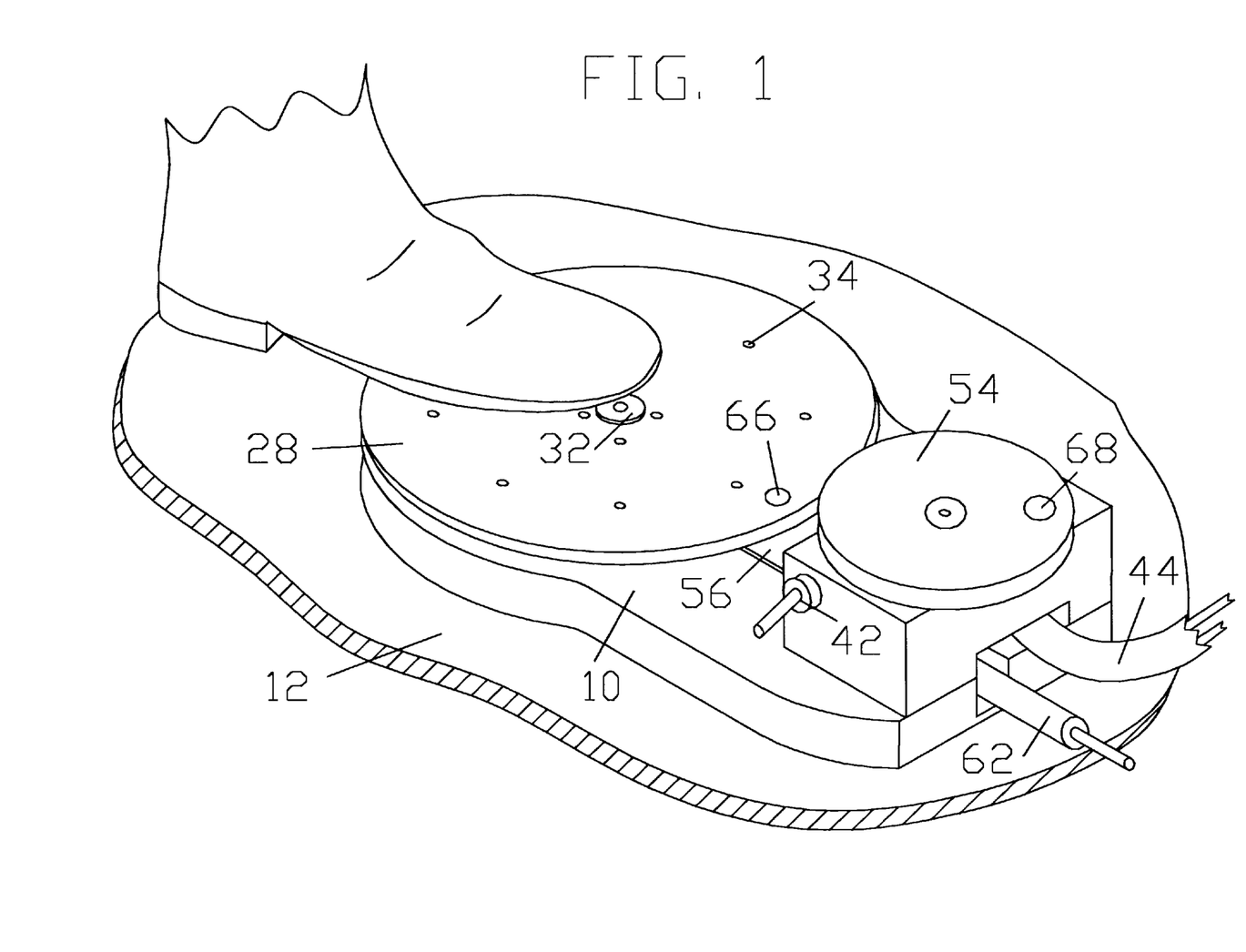
FIG. 1 is a perspective view of a first preferred embodiment of a foot control according to the present invention.
Figure 2:
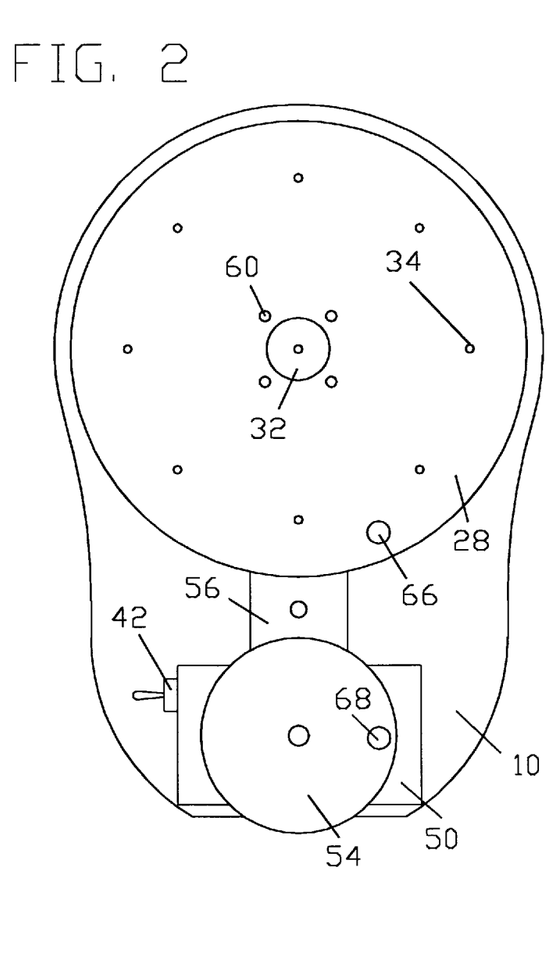
FIG. 2 is a plan view of the foot control of FIG. 1.

A first representative embodiment of the present foot control is illustrated in FIGS. 1 through 5. FIG. 2 shows a plan view of the first embodiment of my foot control, and FIG. 1 shows a perspective view of the foot control with the toe of a shoe placed centrally so as to contact an "on-off button 32 while the main part of the foot remains placed on a foot plate 28. The foot plate 28 is preferably conically shaped for supporting the operator's entire body weight when the foot plate is rotated and the on-off switch 36 is momentarily activated. The foot plate 28 also preferably is made of reflective aluminum to reflect heat, but can be of any other compatible material having sufficient strength to withstand the weight of an operator and the turning forces applied thereto. The foot plate has a direction indicator 66 affixed on forward portion of plate that indicates the direction that the trolling motor is being propelled. As also seen in FIG. 1, the conical shape gives a low degree of rise to the operator's foot when the heel of the foot is placed on the boat deck 12.

A speed control knob 54 is mounted higher than foot plate 28 and is also mounted horizontally on a box 48 to be accessed by the foot of the operator when a speed change is desired. Preferably, the speed control knob 54 has a diameter measurement of two to four inches and is provided with a speed indicator mark 68 fixed thereon for ease of turning and increased visibility as to speed setting.

Shown in FIG. 1, a cable 44 carries a set of wires extending from the trolling motor (not shown) into box 48 that control supply voltage and operational signals to and from trolling motor.

Figure 3:
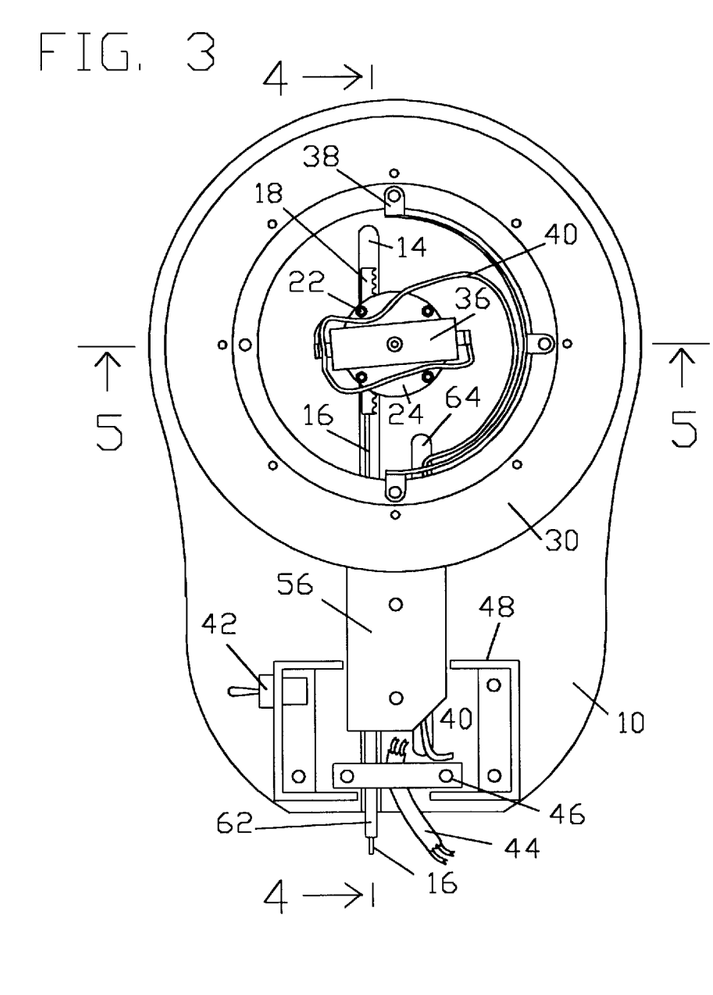
FIG. 3 is a detailed plan view illustrating the foot control with electrical box cover and foot plate removed.

As seen in FIG. 3, which is a detailed plan view of the base plate 10, the base plate is flat bodied and has rounded sides for ease of foot maneuvering. The base plate 10 is advantageously formed of weather-resistant plastic material, but can be made of any other material that can be molded or milled to receive a recessed grove 14 that is mounted low into unit to give a low profile and is extended through and out one end of base plate 10.

Figure 4:
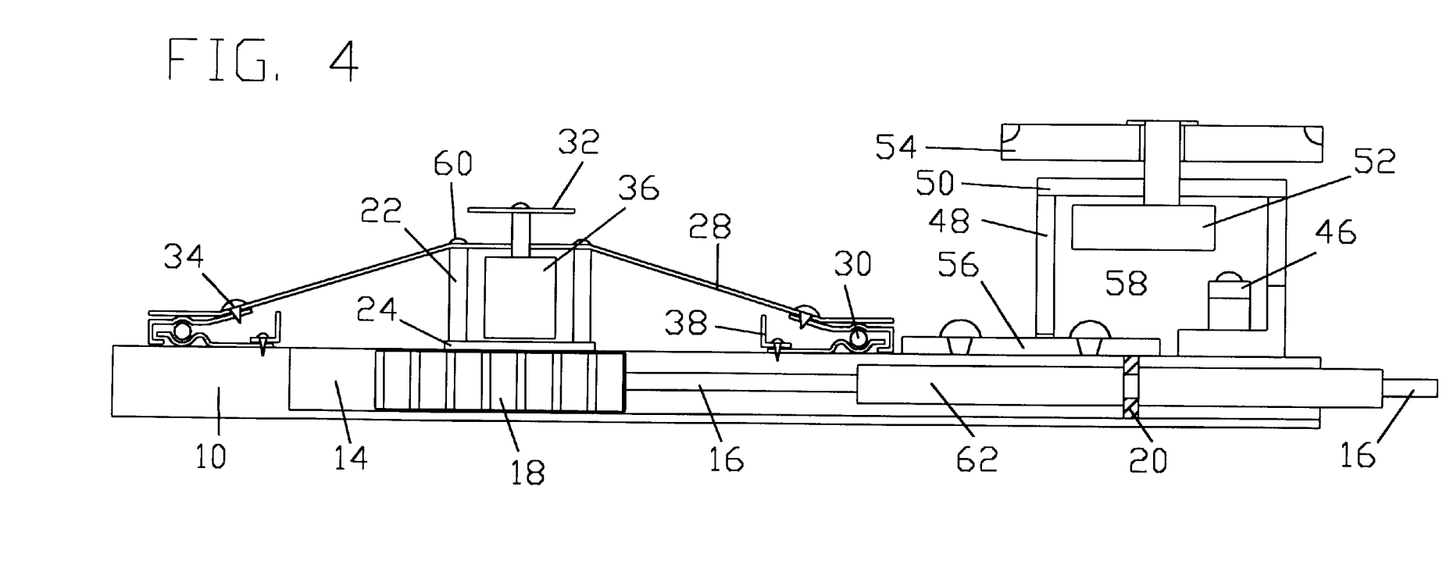
FIG. 4 is a sectional view taken along line 4—4 of FIG. 3.

As seen in FIG. 4, a control cable housing 62 that extends from trolling motor (not shown) into recessed groove 14 and secured by a circular keyway 20 that holds in place the control cable. Protruding from cable housing 62 and extending inwardly is a control cable 16 that is threaded on one end and inserted into a rack 18 that operates in the recessed groove 14. Overlaying base plate 10 is a thrust bearing 30 that is of a low profile that is secured with screws. The foot plate 28 is secured by screws 34 to the thrust bearing 30.

Figure 5:
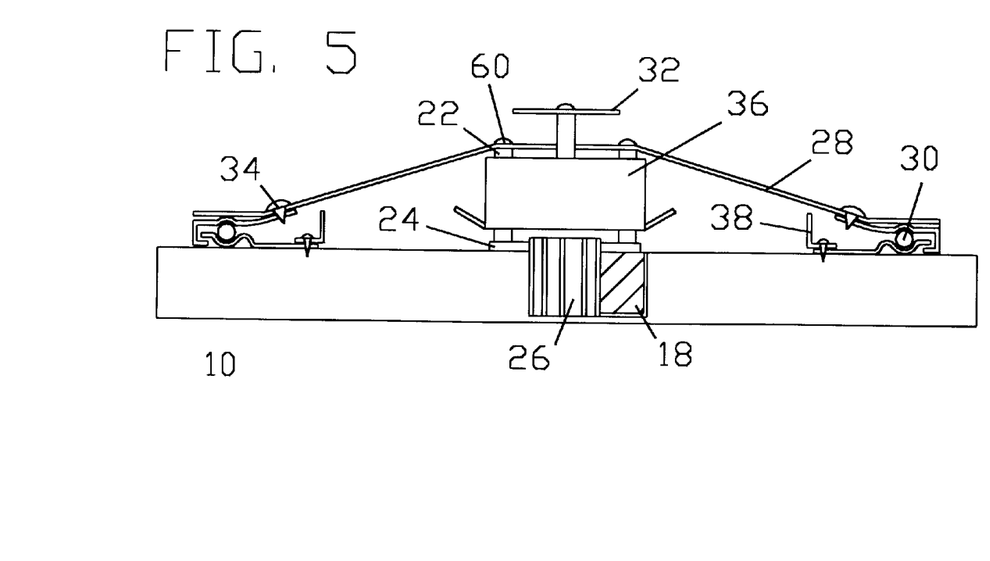
FIG. 5 is a sectional view taken along line 5—5 of FIG. 3.
Figure 6:
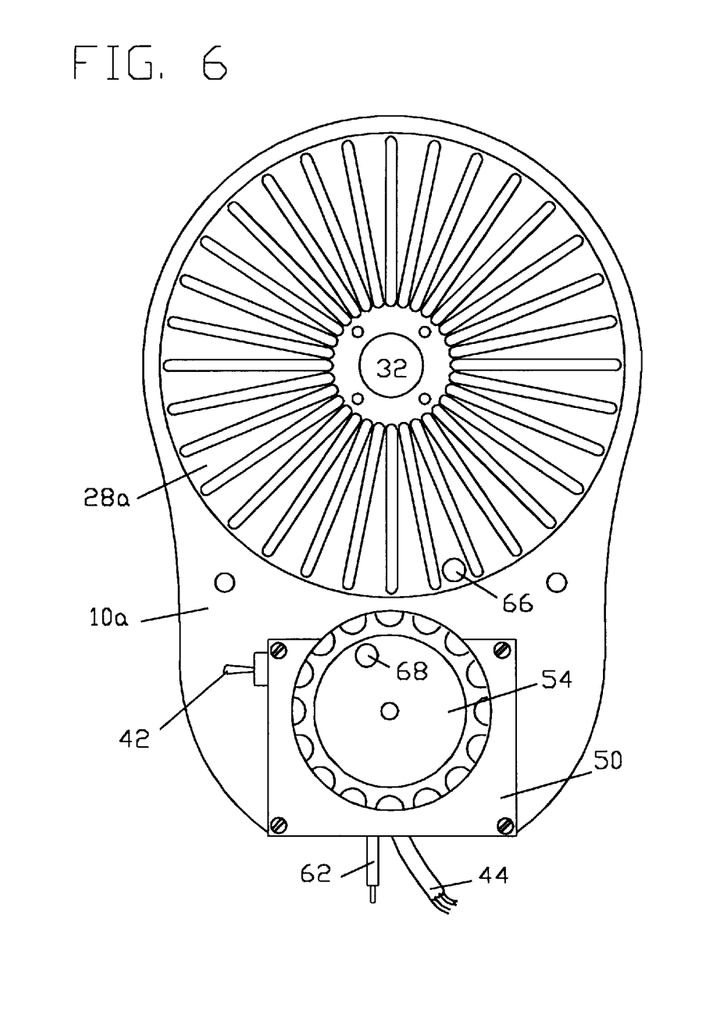
FIG. 6 is a plan view of another foot control according to the invention in which the control cables and wiring are installed from bottom.

As seen in FIG. 5, on-off button 32 is attached to on-off switch 36 that projects up through center of foot plate 28 to give the foot and toe of operator the same access from plural sides without having to reposition foot control in boat. FIG. 3 shows a circuit wire 40 that is flexible and attached to both ends of on-off switch 36 and placed around in the embodiment in such a way as to allow flexing when switch is rotated in either direction. A wire retainer 38 is placed circularly around the control to support circuit wire 40 when movement occurs. A recess cavity 64 extends from under foot plate 28 into box 48 through which circuit wire 40 is passed.

A cover plate 56 is secured with a cover plate screw 58 to base plate 10 and acts as a cover for both recessed cavity 64 and recessed groove 14 and holds in place circular keyway 20 as seen in FIG. 4. The on-off switch 36 is held in place by projecting studs 22 that are threaded internally to receive screws 60 which secure the foot plate 28. As can be seen in FIG. 5, the projecting studs 22 are affixed to a thrust washer 24 that in turn is affixed to a pinion gear 26 that is meshed with a rack 18 in the recessed grove 14 located in base plate 10. The above embodiment or device transfers motion from foot plate 28 to rack 18 which in turn is attached to control cable 16 that transfers forward and reverse motion to pivot the trolling motor about its axis to command steering of the boat.

As also seen in FIG. 4, when on-off button 32 is engaged by the toe of the operator's foot, an electrical connection is made and transferred through circuit wire 40 (as seen in FIG. 3) into box 48. At this stage circuit wire 40 is meshed with wires from a constant on switch 42 and travels on through wiring 44 from trolling motor to the trolling motor (not shown) to propel the boat. Box 48 is a junction box for wire connections and additional switching devices that can be mounted therein and is placed forward of foot plate 28 and secured to base plate 10, for example with screws. Internally mounted in the base plate is a wire clamp 46 that secures wiring 44 from trolling motor that extends into box 48. A speed control or potentiometer 52 extends through a box cover 50 that is secured to box 48, for example with screws. Speed control knob 54, which preferably is mounted horizontally, is attached to the shaft of potentiometer 52 and, when rotated by the foot of the operator, varies the speed of the trolling motor.

Operation and use of the foot control arrangement is simple and straightforward. FIG. 1 shows a perspective view of the foot control of the invention with the toe of an operator's shoe placed centrally to contact the on-off button 32, with the main part of the operator's foot placed on the foot plate 28. The foot plate 28 is conically shaped to support the operator's entire body weight when the foot plate is rotated and on-off switch 36 is momentarily activated. The foot plate 28 may advantageously be made of aluminum to reflect heat, but it can be made of other compatible materials. A turning ratio mechanism to achieve a 1 to 1 turning ratio of foot control to trolling motor is particularly preferred, but other turning ratios are possible, if desired. As also seen in FIG. 2, the conical shape gives a low degree of rise to the operator's foot when the heel of the foot is placed on the floor of the boat deck 12.

FIG. 1 also shows a speed control knob 54 that is mounted higher than foot plate 28 and is mounted horizontally on a box 48. The speed control knob 54 desirably has a diameter measurement of 2 to 4 inches to provide ease of turning and also advantageously has a speed indicator mark placed thereon to provide increased visibility as to speed setting. As shown in FIG. 1, wiring 44 which extends from the trolling motor (not shown) into box 48 carries electrical signals to the trolling motor that control supply voltage and motor operation.

As seen in FIG. 3, a detail plan view showing a flat bodied base plate 10 that has rounded sides for ease of foot maneuvering. Base plate 10 is preferably formed of weather-resistant plastic material, but can be formed of any other suitable material that can be molded or milled to receive recessed grove 14. The recessed groove is mounted low into unit to give a low profile and is extended through and out one end of base plate 10. When foot plate 28 is rotated by the foot of an operator, a directional indicator mark 66 on the forward portion of foot plate 10 indicates that the trolling motor is likewise pointed in same direction, thereby making operator aware as to which direction trolling motor is propelling the boat.

When a rotation is desired to propel boat in a reverse direction, the operator places his foot to the side of foot plate 28 and rotates to reverse position in a one hundred eighty degree turn with one reverse movement of the foot. Then placing his foot back on the foot plate 28, a downward movement of the operator's toe on on-off button 32 activates the motor to propel the boat in the reverse direction. The return to forward direction is the reverse of the movements described above executed on the opposite side of the foot plate.

It is well known that most directional changes of a trolling motor while in a normal forward movement in the water only turn approximately forty five degrees in either direction from a straight forward position. With this in mind, the an operator using the control of the present invention will seldom have to lift his or her foot from the foot plate 28 under normal steering conditions. When operator places his or her foot on foot plate 28, the leg can remain in a straight position with the heel on the deck of the boat to give good balance for the operator in the boat. When a change in direction is needed the heel is lifted momentarily and weight transferred to palm of foot until directional movement has been completed. The heel then drops back to the boat deck 12 to secure the foot. While the above procedure is taking place the toe of the foot can be depressed, if desired by the operator, to energize on-off switch 36 at the on-off button 32 positioned at the center of foot plate 28. This keeps operator balanced and in a comfortable position when these operational procedures are taking place.

When a speed change is desired the foot is lifted and the toe of the operator's foot is placed on the speed control disk 54 that is mounted horizontally on box 48. The toe can rest on speed control disk 54 with sufficient weight applied to steady ones balance, and a desired speed can be selected without risk of the operator losing his or her balance. The speed control disk 54 is of a desired diameter that is easily rotated by the foot of an operator, and has a marked speed indicator 68 disposed thereon which is readily recognizable from a standing position to indicate the speed setting that is desired.

As seen in FIG. 2, box 48 can have additional control switches mounted therein for additional functions such as a constant on switch 42 to keep trolling motor in operation without the operator's foot having to remain on foot plate 28. Other possible controls to be mounted in or on box 48 include a power supply voltage change switch or an on-off power supply switch.

A modified embodiment of the foot control of the invention is illustrated in FIGS. 6 through 11. The construction of this embodiment is in many respects similar to that of the embodiment of FIGS. 1 through 5, and like parts are identified by like reference numerals. In this drawing the foot plate 28a overlays a roller wheel 90 [see FIG. 7 and FIG. 11]. Roller wheel 90 pivots on a roller shaft 88 that transfers rotational movement of foot plate 28a about its axis.

Figure 7:
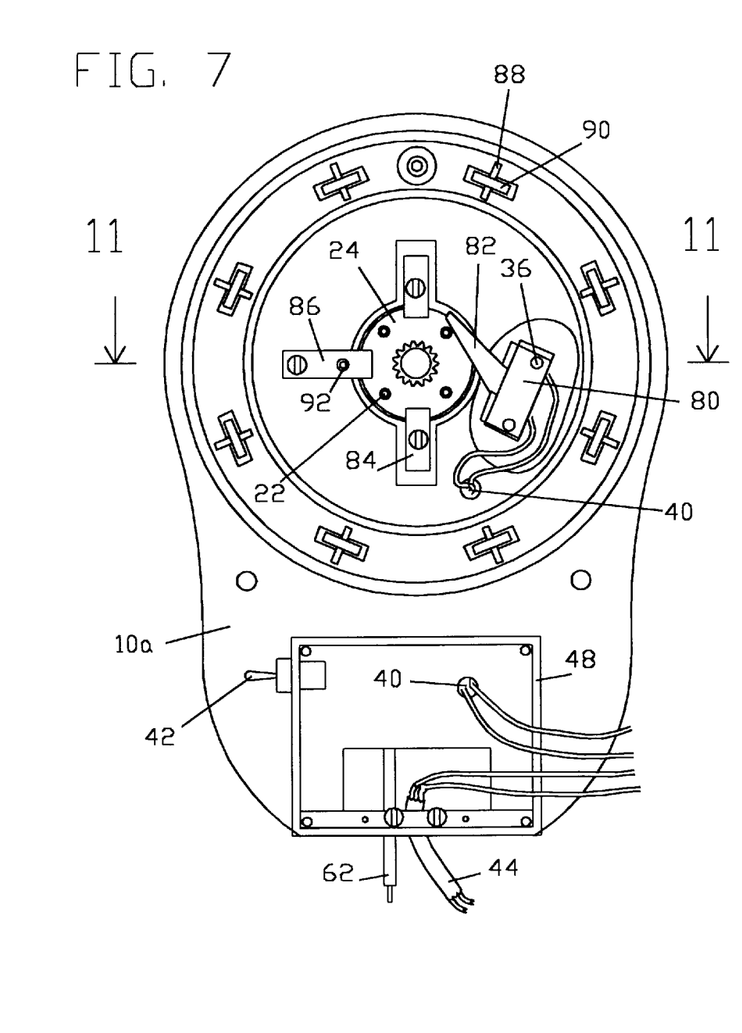
FIG. 7 is a detailed plan view illustrating the foot control with foot plate and electrical box cover removed on the embodiment of FIG. 6.

As seen in FIG. 7 on-off switch 36 is stationarily mounted on the base plate 10a. Mounted on the on-off switch there is a hinge 80 that supports an on-off lever 82, which in turn projects under a rotatable disc 94 that is secured to on-off button 32. Disc 94 is normally held in an upward position by a spring 96. When downward motion is applied to on-off button 32, i.e. by being pressed downward by an the foot of an operator, a downward movement of the disc 94 moves the on-off lever 82 downward to close contacts in the on-off switch 36 whereby a circuit is completed to the trolling motor head [not shown] through circuit wires 40.

A thrust washer keeper 84 is secured to base plate 10*a* and holds in place thrust washer 24. A friction arm 86 extends over thrust washer 24 and is adjusted by an adjustment screw 92 to produce a resistance to free movement of the foot plate 28*a* when not held in place by application of the operator's foot thereto.

Figure 8:
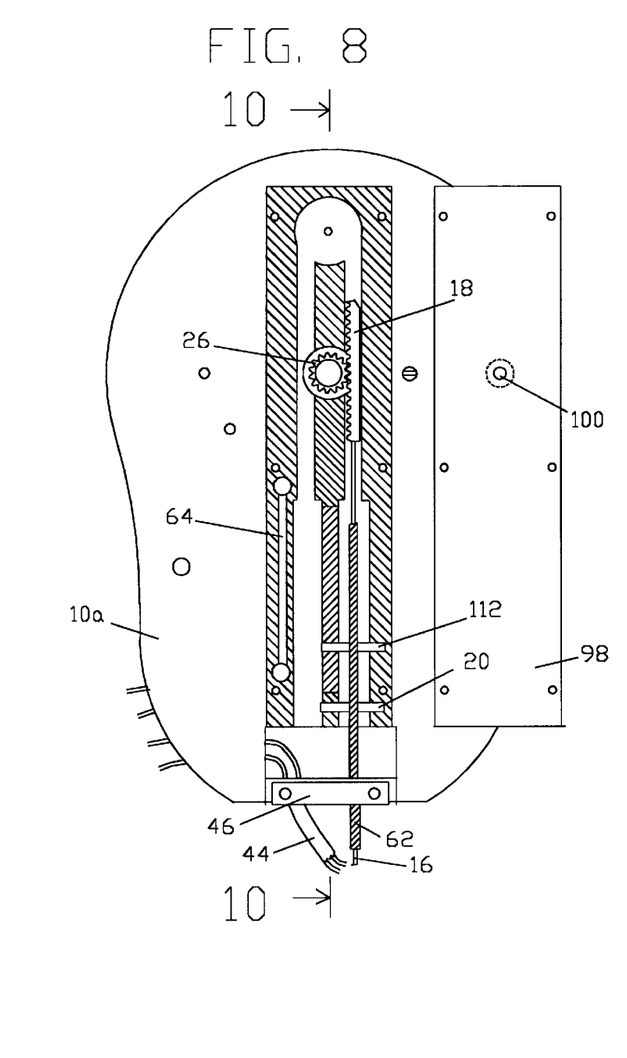
FIG. 8 is a bottom view with a single cable system installed and the cover plate removed.

The internal construction shown in FIG. 8 is similar to that of FIG. 3 in that the rack 18 when attached to single control cable 16 and supported by control cable housing 62 is installed from bottom of base plate 10*a*. A cover plate 98 with a shaft bearing 100 mounted thereon, overlays opening and the shaft bearing 100 extends through pinion gear 26 and becomes pivot for foot plate 28*a* [FIG. 8]. A threaded keyway 112 is used to secure control cable housing 62 for one particular type of trolling motor, and a circular keyway 20 is used for another type of single cable trolling motor. Circuit wiring 40 and control cable housing 62 are secured from bottom of base plate by wire clamp 46.

Figure 9:
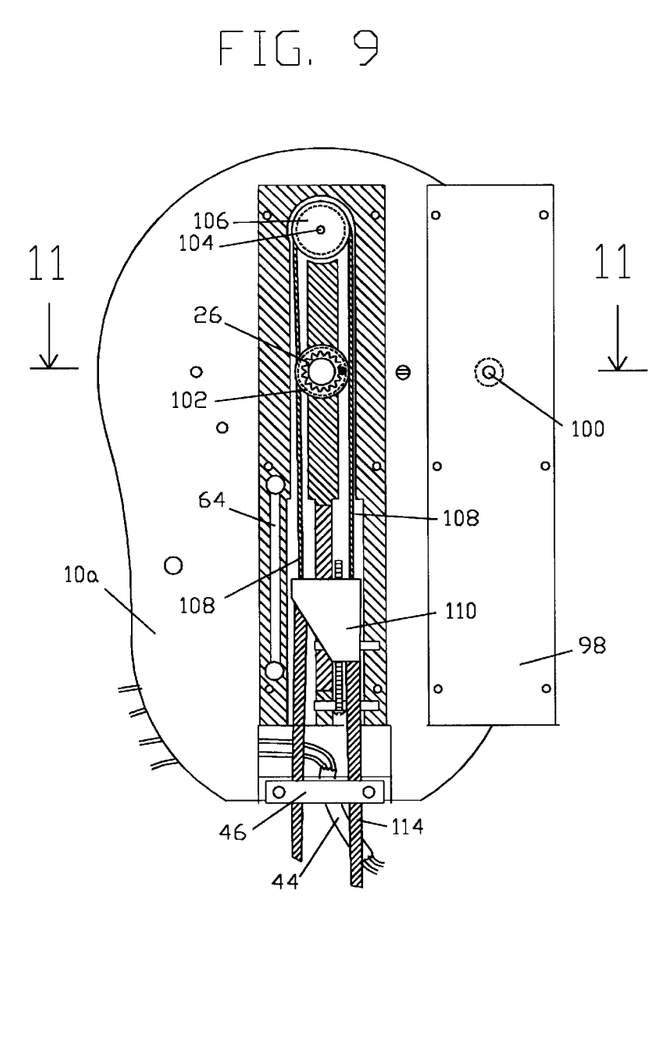
FIG. 9 is a bottom view with a double cable or pull-pull cable system installed and with the cover plate removed.
Figure 10:
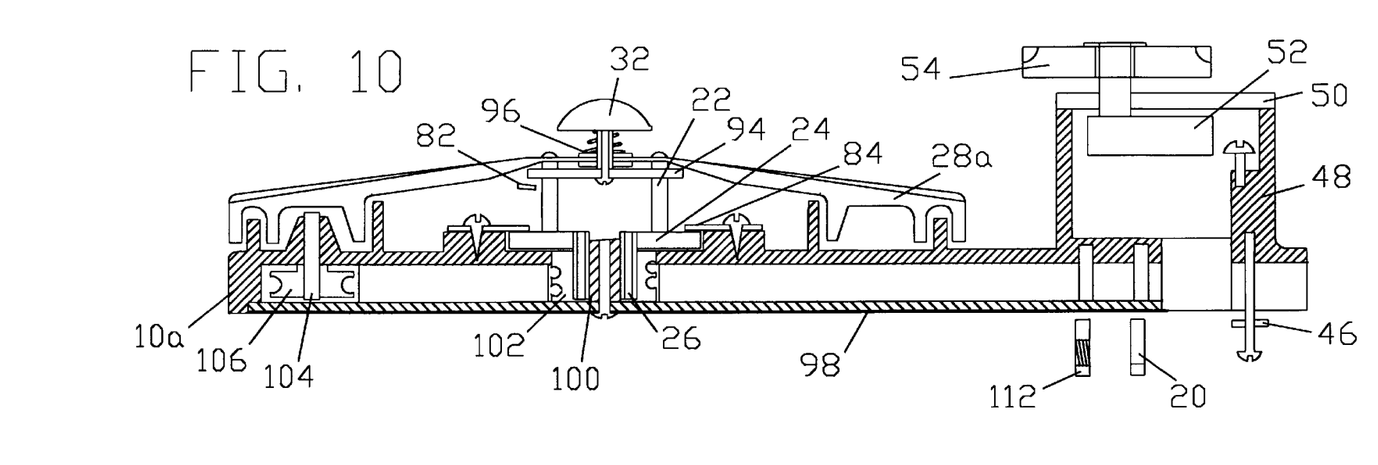
FIG. 10 is a sectional view taken along line 10—10 of FIG. 8.
Figure 11:
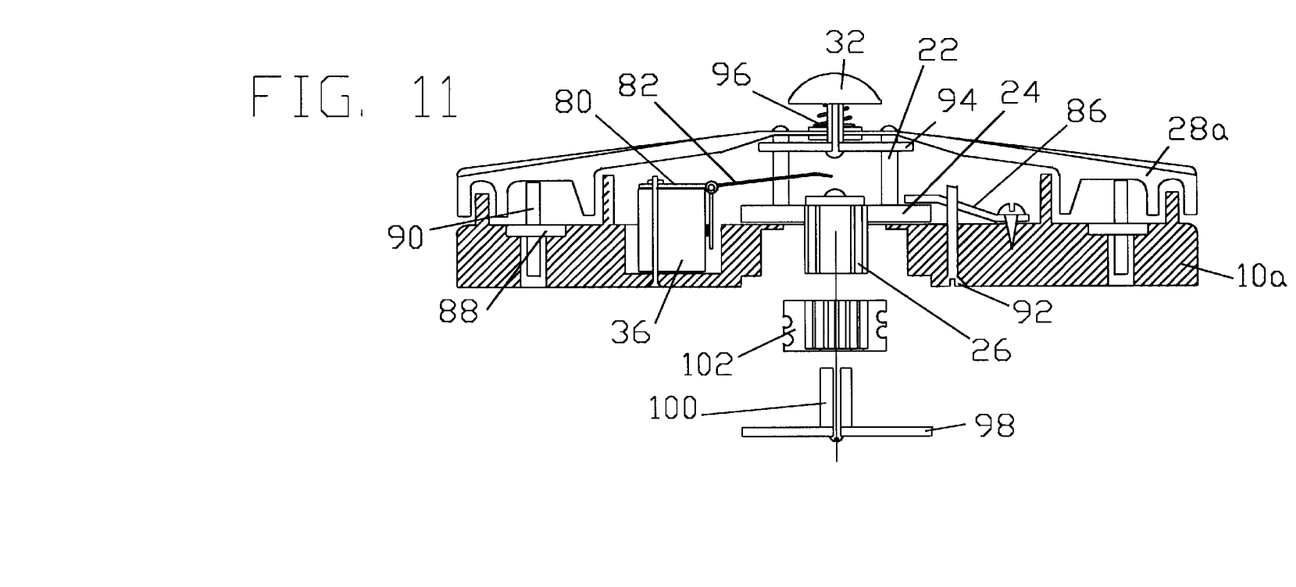
FIG. 11 is a sectional view taken along line 11—11 of FIG. 9 with the pull-pull cable pulley and with the cover plate removed.

The construction of FIG. 9 is similar to FIG. 8 in that it uses same base plate 10*a* and receives two cables in order to establish a pull-pull cable system 108, which exerts a positive pulling force on the motor when turned in either direction. In this arrangement a pull-pull cable pulley 102 receives the ends of two pull-pull cables 108. One is mounted around idler pulley 106 and extends outward and a pull-pull cable housing 114 of each cable is mounted in a cable tightener 110 and is adjusted with a screw mounted therein. FIG. 10 shows how, when using a pull-pull cable system, the idler pulley 106 is mounted over a idler pulley shaft 104 and is secured in base plate 10*a*. Pull-pull cable pulley 102 is shown unattached in FIG. 11.

Accordingly, it can be seen that the foot control of this invention can be operated easily and conveniently with both feet on the deck of the boat. The low profile with a centrally located predisposed on-off switch enables the operator to access and operate foot plate with his or her foot from plural sides without any need to reposition the foot control in the boat. In addition the foot plate having a rotatable mechanism to achieve a desired 1 to 1 turning ratio of foot control to trolling motor, gives ease of turning and increased awareness as to trolling motor direction in the water. The position of the on-off switch actuator in the center of the foot control allows it to be actuated by the toe of an operator while maintaining his or her weight on the foot so as to easily maintain his or her balance. A relatively large diameter speed control disc mounted horizontally and slightly higher than the directional foot control gives greater visibility as to speed setting and ease of turning by foot of operator. Furthermore, the foot control of the invention has additional advantages in that (1) it permits some older existing models of trolling motors as well as new to be adapted for use by its ease of disassembly and reassembly; (2) its conical shape allows in excess of the operator's entire body weight to rest on the foot plate and gives a lower angle rise to toe off the boat deck when placed on foot plate; (3) it provides the foot plate that can be made of light reflective aluminum to minimize any buildup of excessive amounts solar heat on the foot plate; (4) it provides a foot control that its exterior parts can be made of corrosion and weather resistant material; and (5) it provides a flat bodied base plate that has rounded and curved sides to give ease of access and maneuverability of the foot of operator.

Although the description above contains many specifications, these should not be construed as limiting the scope of the invention but as merely providing illustrations of some of the preferred embodiments of this invention. For example, the foot control can have other cable operable means, such as a cable surrounding a pulley means in place of a rack and pinion for rotation of the trolling motor. Thus the scope of the invention should be determined by the appended claims and their legal equivalents, rather than by the examples given.

LIST OF REFERENCE NUMERALS

10 base plate
12 boat deck
14 recessed grove
16 control cable
18 rack
20 circular keyway
22 projection studs
24 thrust washer
26 pinion gear
28 foot plate
30 thrust bearing
32 on-off button
34 screw
36 on-off switch
38 wire retainer
40 circuit wire
42 constant on switch
44 wiring from trolling motor
46 wiring clamp
48 box
50 box cover
52 potentiometer
54 speed control knob
56 cover plate
58 cover plate screws
60 foot plate screws
62 control cable housing
64 recessed cavity
66 direction indicator
68 speed indicator
80 hinge
82 on-off lever
84 thrust washer keeper
86 friction arm
88 roller shaft
90 roller wheel
92 adjustment screw
94 disk
96 spring
98 cover plate
100 shaft bearing
102 pull-pull cable pulley
104 idler pulley shaft
106 idler pulley
108 pull-pull cable
110 cable tightener
112 threaded keyway
114 pull-pull cable housing

What is claimed is:

1. An electro-mechanical foot control for controlling both steering and speed of a trolling motor for a boat, said trolling motor being pivotable about an axis to steer said boat at various steering angles; said control comprising:

a base plate adapted to be disposed on a boat deck;

a first pivotable foot plate mounted on said base plate for rotation about a first vertical axis;

a cable mechanism for transferring pivotal movement of said first foot plate to said trolling motor;

a toe operable switch actuator mounted centrally of said first foot plate; said actuator actuating a switch electrically connected between said trolling motor and a power source for said trolling motor for energizing said motor; and a second pivotable foot plate horizontally mounted on said base plate adjacent said first foot plate for rotation about a second vertical axis; and a speed control for said trolling motor operable by rotation of said second foot plate;

said first foot plate having a conical configuration with a lower height adjacent its periphery to facilitate a user comfortably placing his foot with the heel resting on the deck of the boat and the ball of the foot resting on said first foot plate; and said first foot plate being supported axially relative to said base plate to enable a user to place his weight on said foot plate without axially displacing said first foot plate; whereby a user can operate said foot control from a sitting position or from a standing position with legs straight and both feet on the deck and can access said foot control from plural directions without repositioning said foot control on the boat deck.

2. A foot control according to claim 1, wherein said cable mechanism comprises a pinion gear connected to said first foot plate and a rack engaged by said pinion gear and a Bowden cable connected between said rack and said trolling motor.

3. A foot control according to claim 1, wherein said cable mechanism establishes a substantially one-to-one ratio between pivotal movement of said first foot plate and pivotal movement of said trolling motor.

4. A foot control according to claim 1, further comprising an indicator for visibly indicating the rotational position of said first foot plate and the consequent steering angle of said trolling motor.

5. A foot control according to claim 1, wherein said first foot plate is supported by underlying rollers.

6. A foot control according to claim 1, wherein said first foot plate is supported by a thrust bearing.

7. A foot control according to claim 1, wherein said speed control comprises a potentiometer for varying the voltage supplied to said trolling motor.

8. A foot control according to claim 1, wherein said second foot plate is mounted at a greater height about the boat deck than said first foot plate.

9. A foot control according to claim 1, wherein said base plate has a rounded edge.

10. A foot control according to claim 1, further comprising an indicator on said second foot plate for visibly indicating the rotational position of said second foot plate and consequent speed setting of said trolling motor.

11. A foot control according to claim 1, wherein said switch actuator actuates an on/off switch mounted underneath said first foot plate for rotation with said first foot plate.

12. A foot control according to claim 1, wherein said switch actuator comprises a depressable disk which when depressed engages a radially inwardly extending lever arm of an on/off switch mounted on said base plate.

13. A foot control according to claim 12, wherein said on/off switch is disposed in a recess in said base plate to reduce the overall height of the foot control.

14. A foot control according to claim 1, further comprising a foot actuable constant on/off switch connected between said trolling motor and said power source for continuously supplying power to said trolling motor.

15. A foot control according to claim 1, wherein said cable mechanism comprises a pulley and cable connected at both ends to a lever arm on said trolling motor.

16. A foot control according to claim 1, further comprising a friction brake for retarding free rotation of said first foot plate.

17. A foot control according to claim 2, wherein said rack and pinion gear are recessed into said base plate to reduce the overall height of the foot control.

18. A foot control according to claim 1, wherein said switch actuator comprises a toe operable on/off button disposed centrally of said first foot plate, said on/off button engaging a switch secured to the underside of said first foot plate by a plurality of projecting studs.

19. A foot control according to claim 4, wherein said indicator comprises a visible mark-placed in a forward position on an upper surface of said first foot plate.

20. A foot control according to claim 10, wherein said indicator comprises a visible mark placed on an upper surface of said second foot plate.

21. An electro-mechanical foot control for controlling steering of a trolling motor for a boat, said trolling motor being pivotable about an axis to steer said boat at various steering angles; said control comprising:

a base plate adapted to be disposed on a boat deck;

a pivotable foot plate mounted on said base plate for rotation about a vertical axis; and a mechanism for transferring pivotal movement of said foot plate to said trolling motor;

said foot plate having a conical configuration with a lower height adjacent its periphery to facilitate a user comfortably placing his foot with the heel resting on the deck of the boat and the ball of the foot resting on said foot plate; whereby a user can operate said foot control from a sitting position or from a standing position with legs straight and both feet on the deck and can access said foot control from plural directions without repositioning said foot control on the boat deck.

22. An electro-mechanical foot control for controlling steering of a trolling motor for a boat, said trolling motor being pivotable about an axis to steer said boat at various steering angles; said control comprising:

a base plate adapted to be disposed on a boat deck;

a pivotable foot plate mounted on said base plate for rotation about a vertical axis;

a mechanism for transferring pivotal movement of said foot plate to said trolling motor; and a toe operable switch actuator mounted centrally of said foot plate; said actuator actuating a switch electrically connected between said trolling motor and a power source for said trolling motor for energizing said motor, and said actuator being movable relative to said foot plate, whereby said actuator can be actuated without moving said foot plate;

whereby a user can access said foot control from plural directions without repositioning said foot control on the boat deck.

23. An electro-mechanical foot control for controlling both steering and speed of a trolling motor for a boat, said trolling motor being pivotable about an axis to steer said boat at various steering angles; said control comprising:

a base plate adapted to be disposed on a boat deck;

a first pivotable foot plate mounted on said base plate for rotation about a first vertical axis;

a cable mechanism for transferring pivotal movement of said first foot plate to said trolling motor;

a toe operable switch actuator mounted centrally of said first foot plate; said actuator actuating a switch electrically connected between said trolling motor and a power source for said trolling motor for energizing said motor; and a second pivotable foot plate horizontally mounted on said base plate adjacent said first foot plate for rotation about a second vertical axis; and a speed control for said trolling motor operable by rotation of said second foot plate;

said first foot plate having a conical configuration with a lower height adjacent its periphery to facilitate a user comfortably placing his foot with the heel resting on the deck of the boat and the ball of the foot resting on said first foot plate; and said first foot plate being supported axially relative to said base plate to enable a user to place his weight on said foot plate without axially displacing said first foot plate; whereby a user can operate said foot control from a sitting position or from a standing position with legs straight and both feet on the deck and can access said foot control from plural directions without repositioning said foot control on the boat deck.

24. An electro-mechanical foot control for controlling steering of a trolling motor for a boat, said trolling motor being pivotable about an axis to steer said boat at various steering angles; said control comprising:

a base plate adapted to be disposed on a boat deck;

a pivotable foot plate mounted on said base plate via a plurality of balls or rollers distributed around the circumference of said pivotable foot plate for rotation about a vertical axis;

a mechanism for transferring pivotal movement of said first foot plate to said trolling motor; and an adjustable friction brake for retarding free rotation of said pivotable foot plate.

25. An electro-mechanical foot control according to claim 24, wherein said friction brake is adjusted by an adjustment screw.

* * * * *